United States Patent [19]

Samoylenko

[11] Patent Number: 5,576,702

[45] Date of Patent: Nov. 19, 1996

[54] METHOD AND APPARATUS FOR FAULT-TOLERANT TRANSMISSION IN MULTI-CHANNEL NETWORKS

[76] Inventor: Stanislav I. Samoylenko, 33-75 Ostrovityanov Street, Moscow, Russian Federation, 117279

[21] Appl. No.: 370,387

[22] Filed: Jan. 10, 1995

[51] Int. Cl.$^6$ .................................. H04Q 11/04
[52] U.S. Cl. ................. 340/825.5; 340/825.51; 340/825.52; 370/85.1; 370/85.2; 370/85.3; 370/85.6; 370/85.5
[58] Field of Search ............. 340/825.5, 825.51, 340/825.52; 370/85, 85.2, 85.3, 85.6

[56] References Cited

U.S. PATENT DOCUMENTS

| | | | |
|---|---|---|---|
| 4,663,756 | 5/1987 | Retterath | 340/825.5 |
| 4,707,829 | 11/1987 | Pendse | 370/85.2 |
| 4,787,083 | 11/1988 | Tanaka | 340/825.5 |
| 4,799,052 | 1/1989 | Near et al. | 340/825.51 |
| 5,276,682 | 1/1994 | Van As et al. | 340/825.05 |
| 5,307,350 | 4/1994 | McIntyre | 340/825.5 |
| 5,402,423 | 3/1995 | Van Kersen et al. | 370/85.6 |

FOREIGN PATENT DOCUMENTS

| | | | |
|---|---|---|---|
| 61-236239 | 10/1986 | Japan . | |
| 62-45246 | 2/1987 | Japan | 370/85.2 |
| 62-242439 | 10/1987 | Japan | 370/85.2 |

OTHER PUBLICATIONS

Computer Networking and Performance Evaluation (T. Hasegawwa et al.)–Proceedings of the IFIP WG 7.3 International Seminar, Sep. 18–20, 1985, Tokyo, Japan.

Proceedings of the Seventh International Conference on Computer Communication (J. M. Bennett et al.)–The New Work of the Information Society, Oct. 30–Nov. 2, 1988, Sydney, Australia.

*Primary Examiner*—Michael Horabik
*Assistant Examiner*—William H. Wilson, Jr.

[57] ABSTRACT

A method and apparatus are disclosed for transmitting in multi-channel fault-tolerant networks with bus, star, ring or mixed topology and multi-priority medium capacity distribution by medium idle time monitoring and changing station access numbers. Each station is connected with one or a plurality of communication channels and is assigned a unique set of initial access numbers. The current access numbers of each station are changed when a frame appears on the medium and restored to the initial values after transmission or reception of a network synchronization signal. Each station has a timer to monitor the idle time period when all input access lines of the station are quiescent. The timer starts when the medium becomes idle and stops if the medium becomes busy. When the timer of a station reaches a predetermined value representative of the station's current access numbers and the network time slot, the station is given access to the medium to start frame transmission during an access window of a given length. If the timer reaches a predefined value, representative of the station's current access numbers, total number of initial access numbers used in the network, and the network time slot, the station has to transmit a network synchronization signal. Each station retransmits received data to output channels.

40 Claims, 8 Drawing Sheets

STATION 235

| | | | | | | | | |
|---|---|---|---|---|---|---|---|---|
| CAN | Ø | 2 | 2 | 1 | 1 | 1 | 1 | Ø |
| TFR | Ø | 2TS | 2TS | TS | TS | TS | TS | Ø |
| TSS | 3TS | 5TS | 5TS | 4TS | 4TS | 4TS | 4TS | 3TS |
| TC | Ø | Ø | TS | Ø | TS | 2TS | 3TS | Ø |

STATION 236

| | | | | | | | | |
|---|---|---|---|---|---|---|---|---|
| CAN | 1 | Ø | Ø | 2 | 2 | 2 | 2 | 1 |
| TFR | TS | Ø | Ø | 2TS | 2TS | 2TS | 2TS | TS |
| TSS | 4TS | 3TS | 3TS | 5TS | 5TS | 5TS | 5TS | 4TS |
| TC | Ø | Ø | TS | Ø | TS | 2TS | 3TS | Ø |

STATION 237

| | | | | | | | | |
|---|---|---|---|---|---|---|---|---|
| CAN | 2 | 1 | 1 | Ø | Ø | Ø | Ø | 2 |
| TFR | 2TS | TS | TS | Ø | Ø | Ø | Ø | 2TS |
| TSS | 5TS | 4TS | 4TS | 3TS | 3TS | 3TS | 3TS | 5TS |
| TC | Ø | Ø | TS | Ø | TS | 2TS | 3TS | Ø |

FIG. 8

METHOD AND APPARATUS FOR FAULT-TOLERANT TRANSMISSION IN MULTI-CHANNEL NETWORKS

FIELD OF THE INVENTION

The invention relates to computer communication or, more precisely, to data transmission networks, and it concerns a method and apparatus which support multiple access by network stations to a common communication medium. The invention can be applied to develop local-area networks (LAN), metropolitan area networks (MAN), or wide-area networks (WAN) which support packet data traffic in the multiple access mode, with distributed control of packet transmission by network stations. The most efficient application of the invention can be achieved in LANs and MANs having a multi-channel medium with multi-priority, medium capacity distribution among the network stations to develop fault-tolerant networks with mixed topology, including bus, ring and star sections. The invention can be used in multiple access cable, wired or wireless networks which operate in the radio, infrared, optical, audio or other frequency bands. The invention can also be applicable in other networks and systems which require multiple access.

BACKGROUND OF THE INVENTION

A communication network includes a plurality of stations connected to a common medium for communication. To coordinate transmission over such common medium by the stations of the network, communications on the network follow a prescribed multiple access technique or protocol. Such protocols determine the sequence of actions to be performed by each station to avoid or reduce the impact of interference arising from transmission by other stations.

Conventional widely used local-area networks (LANs) and metropolitan-area networks (MANs) fall into two broad categories: networks with a bus topology and networks with a ring topology. Networks which rely on ring topology (e.g. Token-Ring, FDDI etc.) use token-ring multiple access. Networks which rely on bus topology usually use carrier sense multiple access with collision detection (CSMA/CD) or token-bus multiple access.

Token-access techniques require transmission of control information (tokens) from one network node to another. In the event that the token is distorted, a fairly complicated token recovery procedure has to be initiated, which is a major limitation of token access.

Although the token-access methods are collision-free, they are difficult to implement, and local-area networks which use token access require high investments.

An example of the CSMA/CD protocol is disclosed in U.S. Pat. No. 4,063,220 issued on Dec. 13, 1977 to Metcalfe et al. In accordance with the CSMA/CD protocol, whenever any network station has a packet for transmission, it senses the communication medium, and if the medium is quiescent, the packet is impressed on the network. If the medium is engaged, the station waits and transmits its packet when it detects that the medium is idle. In view of signal propagation delay in the medium, it is possible that two or more stations may start transmitting on the medium almost simultaneously. These transmissions become scrambled and a collision appears in the network. Any packets that have collided must be retransmitted.

To control the adverse effect of collisions each transmitting station seeks to detect such collisions, and once a collision has been detected, transmission is interrupted and delayed for a randomly selected time interval set by the collision recovery procedure.

While the CSMA/CD protocol does facilitate successful data transmission between network stations, a considerable amount of time and medium throughput is lost whenever a collision occurs. Collision probability increases with traffic load, transmission rate and network length, and a higher collision probability results in a longer packet transmission delay. The CSMA/CD protocol cannot be used in real-time fault-tolerant networks with mixed topology, which may include interconnected sections with bus and ring topology, that do not lose connectivity when some of the channels are ruptured. It cannot be utilized for multi-priority distribution of the medium capacity among the network stations.

To improve the efficiency of CSMA/CD U.S. Pat. No. 4,598,285 issued Jul. 1, 1986 to Hoshen discloses a formula to improve average delay time after a collision in a communication network with the CSMA/CD protocol. However, while this method can decrease collision resolution time, it does not prevent the negative effect of collisions and it cannot be used in real-time networks with a fault-tolerant, mixed topology or for multi-priority capacity distribution.

Another modification of CSMA/CD (U.S. Pat. No. 4,628,311 issued Dec. 12, 1986 to Milling) assigns to each station an access window within a predetermined response period after the medium becomes idle. To distribute transmission capacity among the stations, the access windows available to all stations are assigned among them in rotation, providing all stations essentially equal access to the medium. If the medium has long been idle and the network nodes have no packets for transmission, and if the time assigned to the response has expired, any station which has a packet for transmission sends a special sync bit pattern to clock the network prior to transmitting its packet. Once the sync bit pattern has been transmitted each station again receives its access window and can transmit frames, if the medium is not seized first by another station with an earlier window. Although this patent is entitled "Carrier-Sense Multiple-Access with Collision Avoidance" (CSMA/CA), the inventor admits that his protocol, although reducing collision probability as it does, is unable to eliminate collisions altogether. Besides, the CSMA/CA protocol requires transmission of access control information to rotate the assignment of access windows. To achieve that, each frame has to contain, in its header, a window rotation control field. When a frame is distorted by unavoidable transmission errors, the network stations lose window rotation control information, which may lead to collisions. As the frame header has to be modified, a CSMA/CA network cannot use standard frame formats such as the Ethernet format. The protocol cannot be used in real-time networks with a fault-tolerant mixed topology or in networks with multi-priority distribution of the medium capacity.

Another collision avoidance scheme exists which assigns to each station an access window for determining the beginning of transmission after the medium becomes idle (U.S. Pat. No. 4,799,052 issued Jan. 17, 1989 to Near et al.). According to this patent, the time period between the instant the medium is released and the access window of a given station depends on the station's unique medium address number and also on the medium address number of the station which was the last to transmit before the medium became idle. However, this method also requires access control information to be passed through the network to determine whether or not a given station may send its packet. This information defines the medium address number of the station which is transmitting a frame. All frame headers must therefore include a special control field for the medium address number of the transmitting station. Similar to the previous scenario, no standard frames such as the Ethernet frame can be used with this protocol. Moreover, as in the previous scenario, the receiving station loses access control information if the frame is distorted in transmission, and recovery requires a special procedure. This protocol cannot be used in real-time networks with a fault-tolerant mixed topology or in networks with multi-priority medium capacity distribution.

The discussion above reveals that not one of the known protocols can be used for constructing multi-channel, real-time, fault-tolerant networks with a mixed topology and multi-priority distribution of the network medium capacity.

It would therefore be desirable to develop a collision-free protocol that does not require transmission of access control information within standard data frames; can be implemented without any changes in data frame formats; makes possible real-time networks with a mixed, fault-tolerant topology, which may include bus, star and ring sections; and which provides multi-priority distribution of the network medium capacity among the network stations.

It is therefore the main object of the invention to provide a transmission method and apparatus for stations with a common multi-channel communication medium which could be used to construct fault-tolerant networks, operational when one or more channels of the medium are broken.

It is another object of the present invention to provide a method and apparatus for multi-priority distribution of the network medium capacity between the network stations.

It is still another object of the present invention to provide a method and apparatus to accomplish collision-free, real-time packet transmission without transmission within data frames of any specific access control information, which makes it possible to use any frame formats, including standard ones.

In accordance with the present invention a method and apparatus are provided for data transmission on a multi-channel communication network, having a communication medium and a plurality of stations. The medium may comprise one or more communication channels with the same or different topology: bus, star, ring or mixed, including fault-tolerant topology. Each station may be connected to one or more communication channels for transmitting and receiving data, comprising data frames for information transmission and sync-signals for network synchronization. The channels may be point-to-point unidirectional or bidirectional ones for connecting two stations, one of which transmits data to the channel and the other receives the transmitted data from the channel. Alternately, the channels may be multipoint bidirectional, connecting more than two stations, each of which can transmit and receive data to/from the channel.

When a station has access to the medium it transmits its data to all output channels to which this station is connected. A station receives data from a single channel which has first become busy after an idle period, during which there was no data on any input channels connected to the station. The data received by a station from a selected input channel is retransmitted to all output channels to which this station is connected.

The present method of transmission to the medium by each station comprises the steps of: assigning each station a unique set of initial access numbers; assigning each station a set of current access numbers representing the station's set of initial access numbers and the number of frames received and transmitted by the station after the sync-signal has been received or transmitted; starting an access timer at each station upon detecting the absence of transmission on all channels connected to the station; stopping the count on the access timer at each station upon detecting the presence of transmission on a channel connected to the station; comparing the access timer count of each station with a value of TFR, representative of the station's set of current access numbers and the network time slot TS, a function of the network parameters; comparing the access timer count of each station with a value of TSS, representative of the stations' set of current access numbers, the number of stations on the network and the network time slot TS; opening an access window of predetermined duration when the access timer of a station reaches a value equal to the TFR; permitting transmission of a frame from a station to all output channels, to which the transmitting means of this station is connected when the access window of this station is open; retransmitting from each station input data received, after an idle period, from an input channel where the data has appeared first, to all other channels to which the transmitting means of this station is connected; transmitting the sync-signal from a station to all channels to which the transmitting means of this station is connected, starting when the access timer of this station reaches the value of TSS.

BRIEF DESCRIPTION OF THE DRAWING

While the invention will be described with reference to the accompanying drawings in which specific, but nonetheless illustrative, operating environments for one of several possible embodiments of the invention are shown, it is to be understood that the present invention may be embodied in forms which differ from the particular form described hereinafter, while still retaining features and benefits of the invention. In the drawings:

FIG. 8 is a timing diagram illustrating the process of data transmission in the network presented in FIG. 2C.

DETAILED DESCRIPTION OF THE PREFERRED EMBODIMENT

The main goal of the present invention is to develop a method for data transmission not only in conventional multiple access network with bus, ring or star topology, but also in multi-channel networks with mixed topology including fault-tolerant ones providing multi-priority distribution of the network medium capacity between the network stations.

Figure 1:
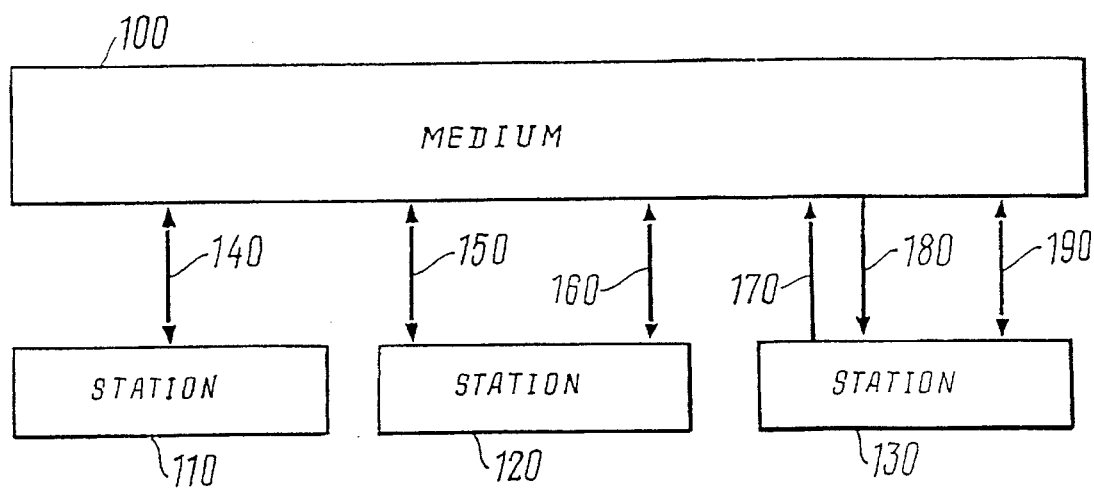
FIG. 1 is a block diagram of an illustrative example of a network.

FIG. 1 presents a simplified conventional diagram of a communication network. The network comprises a plurality of stations 110–130 interconnected via a common medium 100, which may comprise one or more multipoint or point-to-point channels used for bidirectional or unidirectional data transmission between the stations of the networks. The network may have different types of topology (bus, ring, star or mixed), including fault-tolerant topology which provide connectivity between the network stations even when one or several channels of the medium are broken.

Figure 2A:
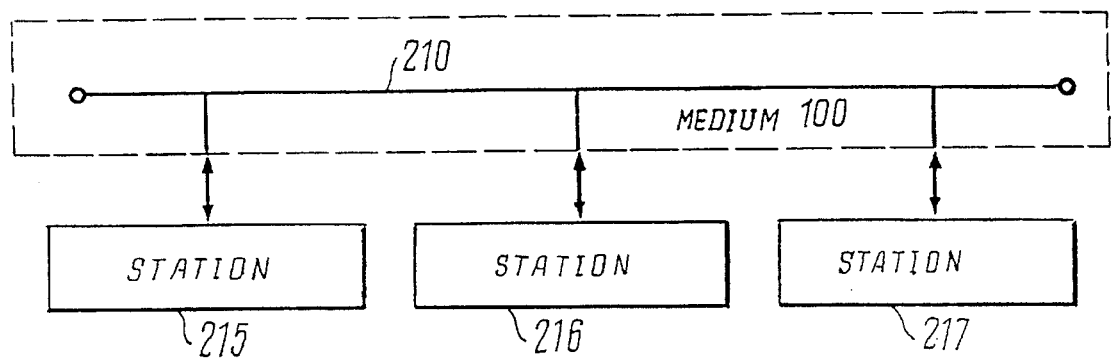
FIGS. 2A through 2E illustrate several possible medium topology types: a bus topology with a multipoint bidirectional channel (FIG. 2A); a ring topology with point-to-point unidirectional channels (FIG. 2B); a fault-tolerant ring topology with point-to-point bidirectional channels (FIG. 2C); a mixed topology including a bus section and fault-tolerant ring section (FIG. 2D); and a fault tolerant double ring topology with point-to-point unidirectional channels (FIG. 2E)
Figure 2B:
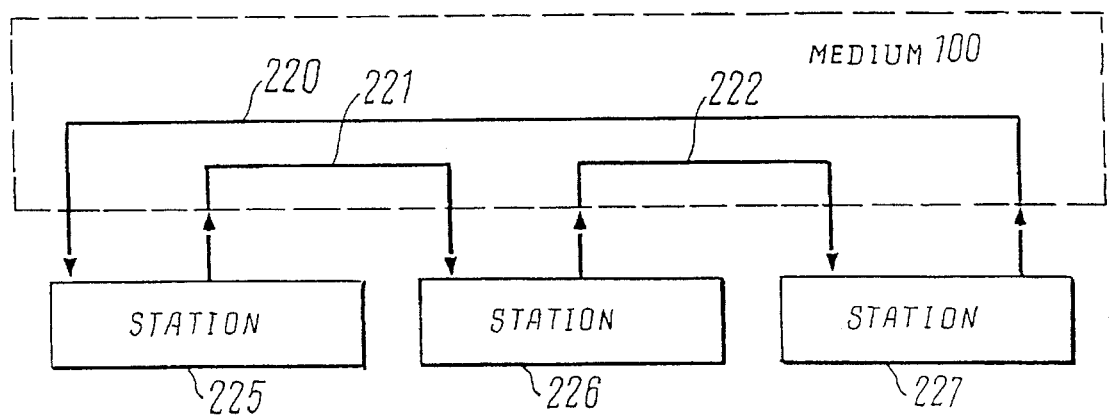

FIGS. 2A–2E (also referred to collectively as "FIG. 2") illustrate several examples of network topologies. The conventional bus topology is shown in FIG. 2A. It comprises a single bidirectional multipoint channel 210 which connects all stations of the network 215–217. The network illustrated in FIG. 2B is a ring network which uses unidirectional point-to-point channels 220–222.

Figure 2C:
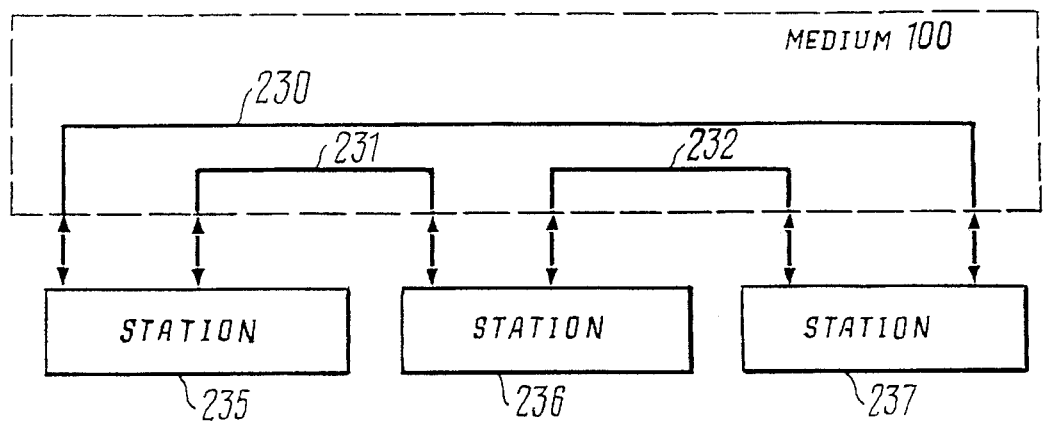

FIG. 2C illustrates a network with fault-tolerant ring topology, using bidirectional point-to-point channels 230–232. If one of the channels of this network is broken all nodes still have connectivity with each other. For example, if the channel 231 is broken stations 235 and 236 can communicate through channels 230 and 232.

Figure 2D:
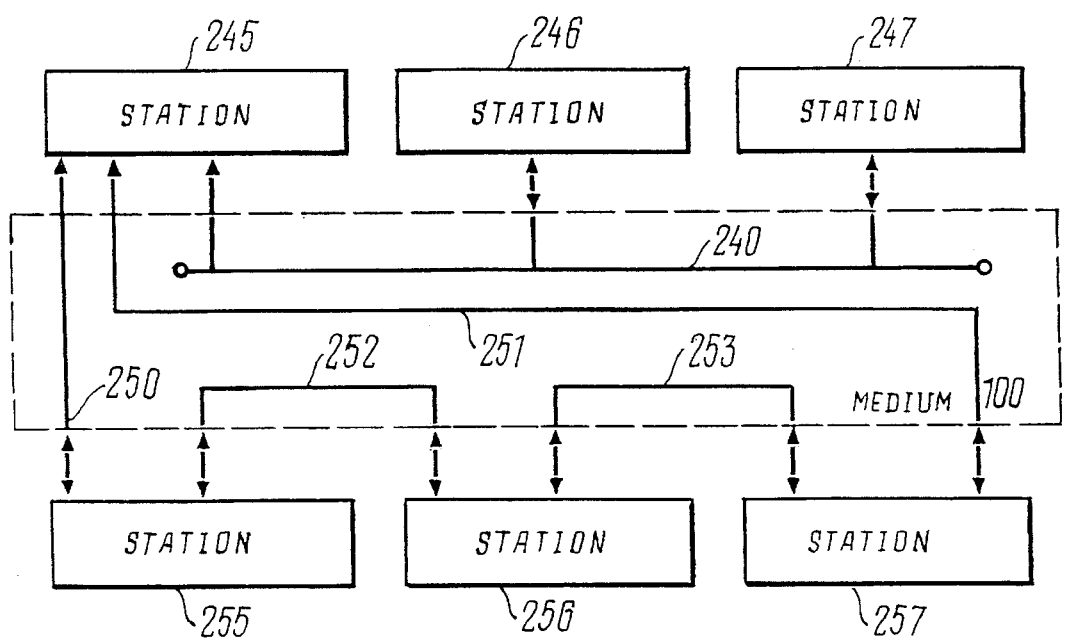

FIG. 2D illustrates a network with a mixed topology, comprising the bus section on the channel 240 and the fault-tolerant ring section with the channels 250–253.

Figure 2E:
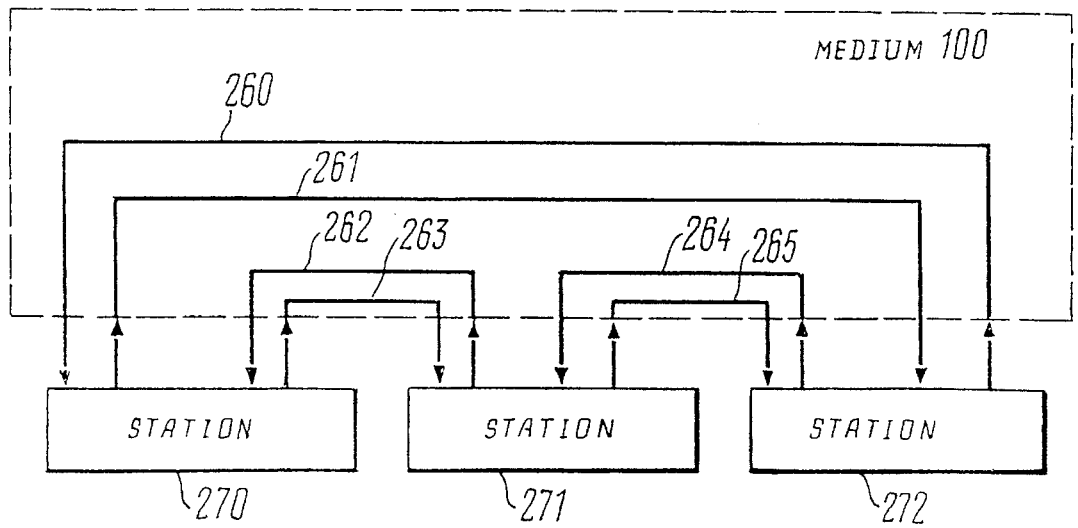

FIG. 2E shows an example of a fault-tolerant ring network using unidirectional point-to-point channels. This network maintains connectivity between all nodes even when two channels connecting a pair of nodes are broken. Thus, if, for example, the channels 262 and 263 are broken the nodes 270 and 271 still have connectivity through the channels 261–264 and 265–260.

Figure 3:
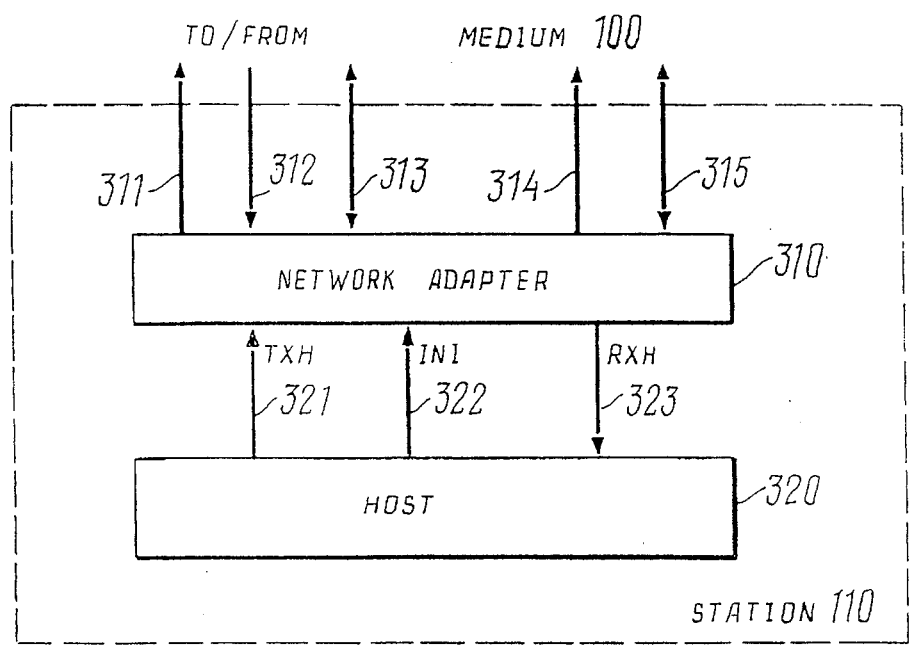
FIG. 3 is a block diagram of a station which is a component of the network of FIG. 1 and FIGS. 2A–2E.

Each network station 110–130 in FIG. 1 includes two principal components (FIG. 3): a network adapter 310 designed to support multiple access and provide an interface between the medium and a user's host; and the user's host 320, which may be a personal computer, a terminal, a mini, a mainframe, a data processor, etc.

Figure 4:
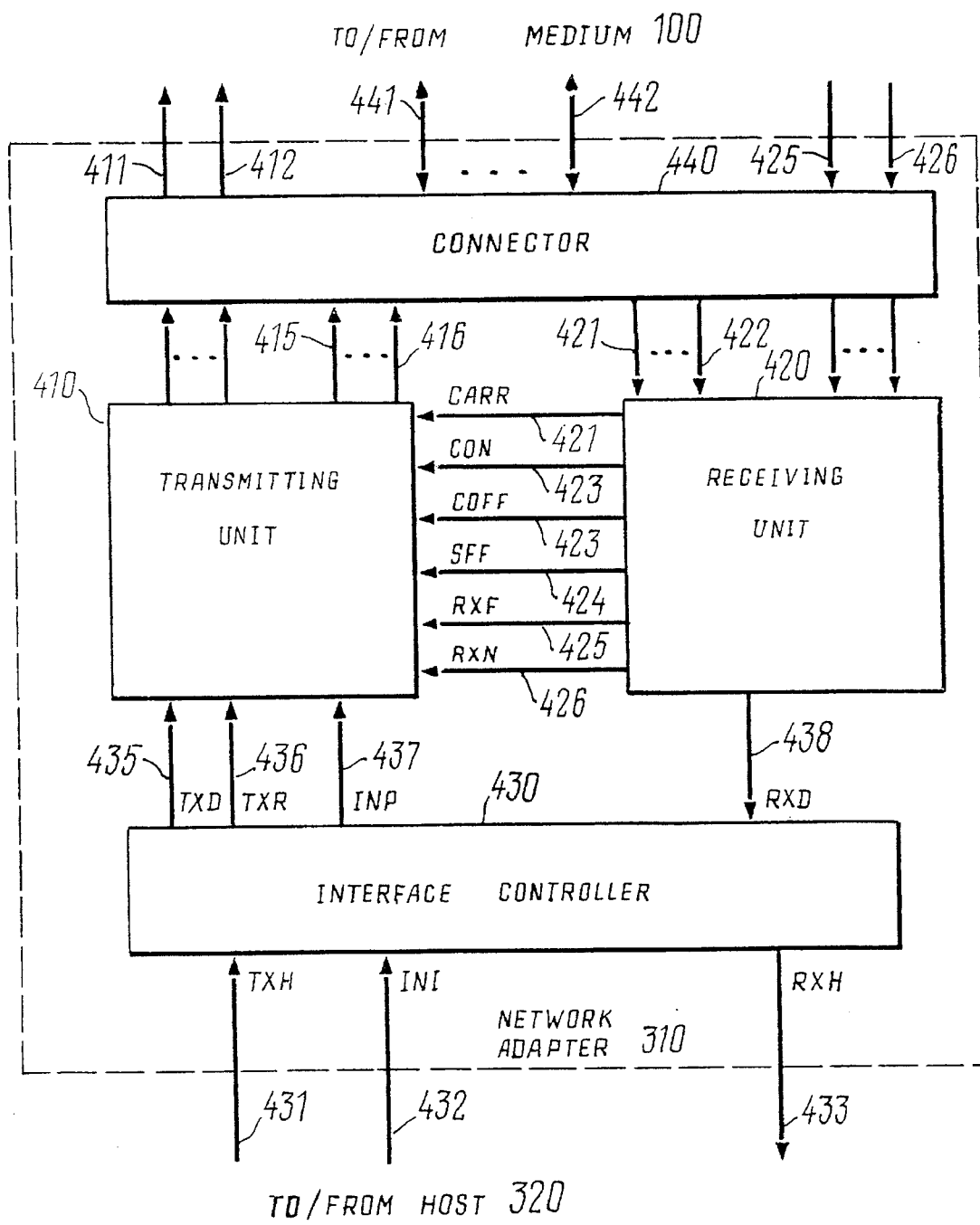
FIG. 4 is a block diagram of a network adapter which is a component of the station of FIG. 3.

The network adapter 310 (FIG. 4) has the following principal components: a transmitting unit 410, a receiving unit 420, an interface controller 430 and a connector 440.

The transmitting unit 410 supports the selected access method and provides an interface between the interface controller 430 and the medium 100. Channels are connected with the transmitting unit 410 and receiving unit 420 via connector 440, which splits receiving and transmitting signals and transfers the transmitting signals to the receiving means. The transmitting unit 410 is the principal block of the network adapter implementing the inventive method and will be discussed in more detail below.

The interface controller 430 is an interfacing block between the host 320, transmitting unit 410 and receiving unit 420. The interface controller 430 receives from the host 320 data and destination address (TXH) 431, as well as information for network adapter initialization (INI) 432. It supplies the transmitting unit 410 with the data and an address information (TXD) 435, as well as with a signal (TXR) 436, indicating that the data is ready for transmission, and with parameters for network adapter initialization (INP) 437, including the station's initial access numbers (IANs), the number of nodes in the network (N), and network time slot (TS). The interface controller 430 receives from receiving unit 420 data addressed to the host (RXD) 438 and sends this data to the host (RXH) 433.

The receiving unit 420 provides an interface between the medium 100, the interface controller 430 and the transmitting unit 410.

The receiving unit 420 supplies the transmitting unit with the following information: CARR (421)—which determines whether or not the medium is occupied at a given point in time; CON (423)—a signal indicating that the medium state has changed from idle to busy; COFF (423)—a signal indicating that the medium state has changed from busy to idle: SSF (424)—a sync-signal flag, indicating that the sync-signal has been received; RXF (425)—data being received at a given time; and RXN (426)—a signal indicating an input channel number, from which data are being received at a given time.

Figure 5:
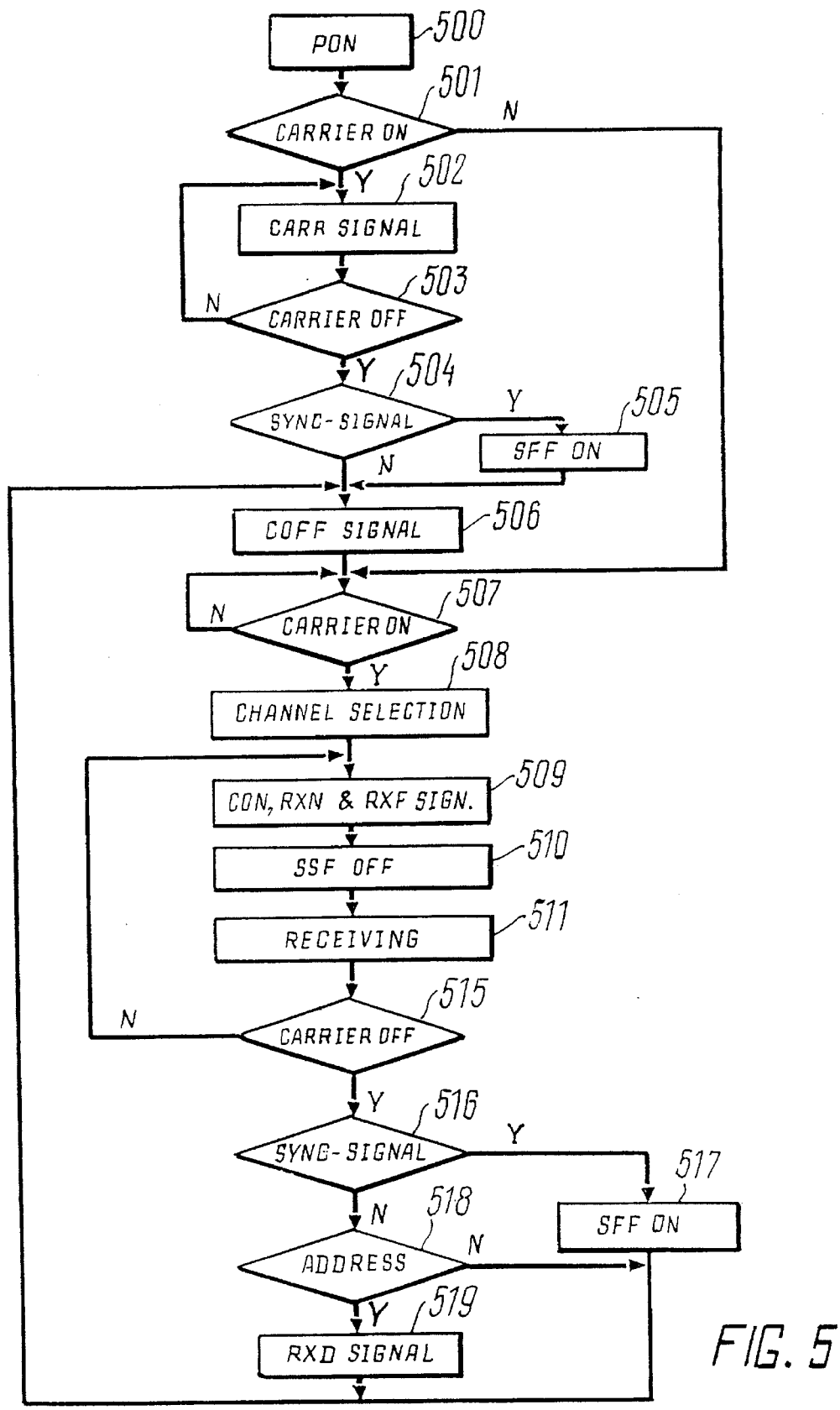
FIG. 5 is a flow chart of the operation of the receiving unit, which is a component of the network adapter of FIG. 4.

The operation of the receiving unit 420 is presented in detail in the flow chart of FIG. 5. When a given station is powered on and becomes operational (PON) 500, the receiving unit, as indicated in block 501 tests for the presence or absence of the carrier. If the carrier is ON the receiving unit generates the signal CARR at block 502, sending it to the transmitting unit 410, FIG. 4. It then waits until the medium becomes quiescent (block 503) and then examines if the received signals are sync-signal or a data frame (block 504). If the signal analysis indicates that the sync-signal was received, the sync-signal flag (SSF) is set ON (block 505) and the receiving unit generates the COFF signal (block 506), sending it to the transmitting unit.

If after a given station is powered ON (at block 500) the carrier is OFF (test at block 501) the receiving unit waits for the appearance of transmission (a carrier being present) on the medium (block 507). When after an idle period the carrier is ON and an input channel, connected to the station, goes ON (block 507) the receiving unit selects the channel in which the carrier has appeared as the receiving channel and ignores all other input channels (block 508) connected to the station until the medium becomes quiescent. The identifiers of the selected channel (RXN), the CON signal and receiving data (RXF) are transmitted to the transmitting unit by sending the RXN, CON and RXF signals (block 509) and the sync-signal flag is set OFF (block 510). In this state the receiving unit receives input data from the selected input channel (block 511) until the medium becomes quiescent.

When the medium becomes quiescent, i.e. there is no carrier in any of the input channels connected to the station (test at block 515), the receiving unit examines if the received data is the sync-signal or a data frame (block 516). If the sync-signal was received the sync-signal flag (SSF) is set ON (block 517) and the procedure returns to block 506 which was described earlier. In the event that a data frame was received, the receiving unit examines the destination address of the frame (block 518) and if the address is not the address of this node or if errors were detected in the received data frame the procedure returns to block 506. If the received data contains the correct data frame addressed to this station, the receiving units generates the RXD signal (block 519) sending it to the interface controller to indicate that a data frame for this node was received, and the procedure returns to block 506.

Transmitters 610 execute three functions: transmitting a data frame (TXD) received from the interface controller to all output channels connected to this station; retransmitting data received from the receiving unit 420 (RXF) to all output channels, but the channel RXN from which the data RXF are received, and transmitting the sync-signal generated by this station to all output channels. The transmitters 610 start transmitting data frame TXD upon receiving from the access timer the transmit command TXC if the TXR signal is ON. When receiving RXN and RXF signals from the receiving unit 420 the transmitting unit 410 executes the retransmitting function. The sync-signal transmitting function is performed upon receiving the SSC command from the access timer. The transmitters must start transmission of a data frame or sync-signal during a predetermined access window time (DW) after a TXC or SSC command has been received.

Figure 6:
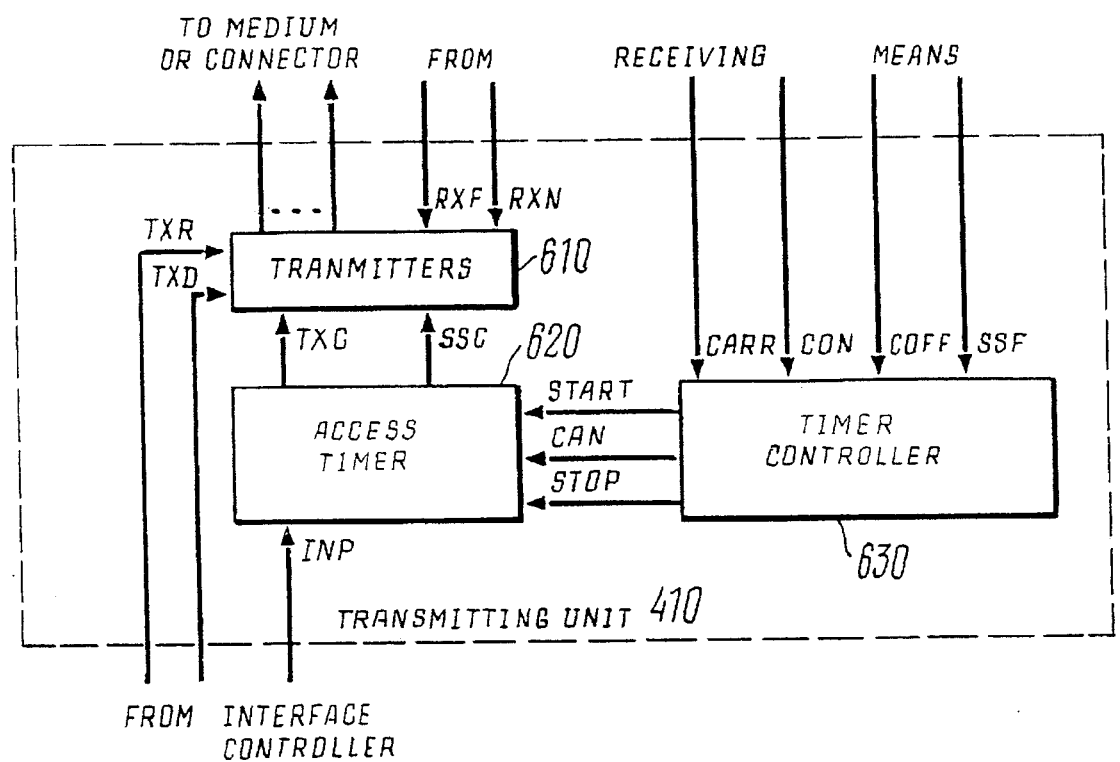
FIG. 6 is a block diagram of a transmitting means which is a component of the network adapter of FIG. 4.

The access timer 620 (FIG. 6) operates a follows. During initialization of the station the access timer receives from the interface controller the main predetermined parameters (INP), which are needed to define the network time slot (TS), and the number of nodes in the network (N). The access timer 620 starts to count the time slots upon receiving the START signal from the timer controller 630 and stops the count and resets to zero upon receiving the STOP signal from the timer controller 630. When the count reaches a value of TFR, representative of the station's current access number (CAN) and the network time slot (TS), the timer generates a command TXC to permit transmission by transmitters of a data frame to the medium. If the timer's count reaches the value of TSS, representative of the station's current access number (CAN), the number of stations in the network (N), and the network time slot (TS) the timer generate a command SSC to transmit the sync-signal to the medium.

Figure 7:
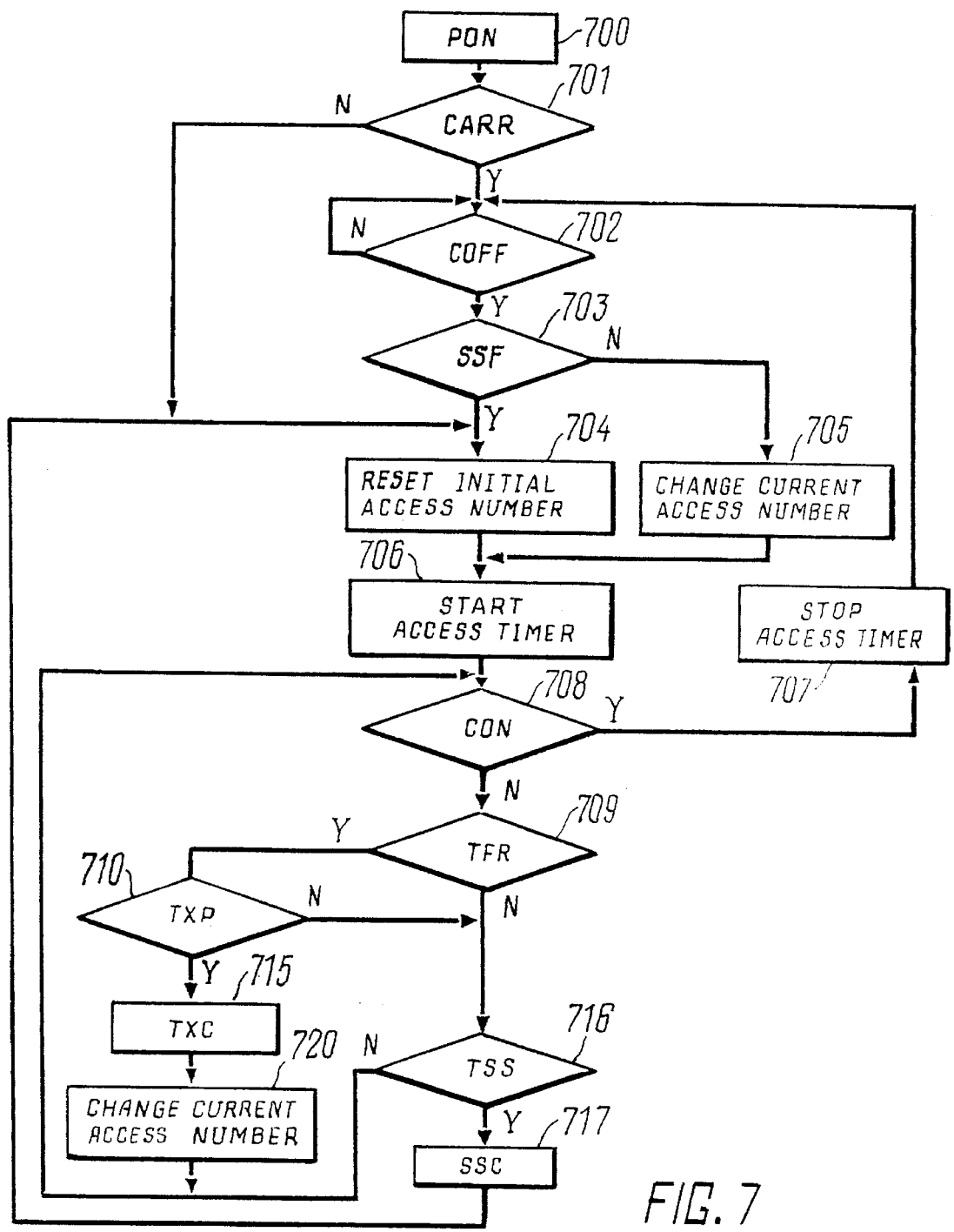
FIG. 7 is a flow chart of the operation of the transmitting unit which is a component of the network adapter of FIG. 4.

The operation of the transmitting unit is illustrated by the flow chart of FIG. 7. When a given station becomes operational (block 700) the timer controller 630 examines the CARR signal received from the receiving unit 420 (block 701). If the medium is busy and the CARR signal is on, the timer controller waits until the medium becomes quiescent and the COFF signal is received from the receiving unit 420 (block 702).

Upon receiving the COFF signal, the timer controller examines if sync-signal flag SSF is ON (block 703). If so, the current access number of the station is reset to the value of the initial access number of the station (block 704) and the access timer is started (block 706). Otherwise, when SSF is OFF, the timer controller changes the current access number of the station by means of a predetermined procedure (block 705) and then starts the access timer (block 706).

While the access timer operates, the timer controller monitors if the medium remains quiescent (block 708) and if the medium becomes busy and the CON signal is ON, the access timer is switched OFF (block 707) and the procedure waits until the medium is again quiescent (block 702). If the medium remains idle and the count of the access timer becomes equal to a value of TFR (test in block 709), the transmitting unit examines if there is a frame for transmission (block 710) and if the TXR signal is ON the TXC command is generated (block 715), the current access number is changed (block 720) and the procedure returns to block 708, which was described earlier. If the count of the access timer is equal to the value of TFR, and there is no data frame for transmission (TXR signal is OFF) or the count is not equal to a value of TFR, the timer controller examines if the count of the access timer is equal to the value of TSS (block 716). If the count of the access timer is equal to the value of TSS the timer controller generates the command for sync-signal transmission (block 717) and the procedure returns to block 704 described earlier. In the event that the count of the access timer is not equal either to the value of TFR or the value of TSS, the procedure returns to block 708, described earlier.

The procedure of transmitting data frames and the sync-signals in a fault-tolerant network shown in FIG. 2C is illustrated in FIG. 8. The illustrative network includes 3 stations 235, 236 and 237 (FIG. 2C). All the stations have an equal priority. The station 235 is connected via bidirectional channel 231 with the station 236 and via channel 230 with the station 237. The stations 236 and 237 are connected via channel 232. In the description below it will be assumed that channel 231 is shorter than channel 230. It will also be assumed that station 235 has the initial access number 0, station 236 the initial access number 1, and station 237 the initial access number 2. The number of nodes in the network (N) is equal to 3. In this example it will also be assumed that at each station the current access number (CAN) decreases by 1 modulo N upon receiving or transmitting a frame, the value of TFR is equal to CAN*TS and the value of TSS is equal to (CAN+N)*TS.

The timing diagram illustrated in FIG. 8, is started from the moment when the station 235 transmits the sync-signal 801. The station 236 receives this sync-signal with a delay equal to the propagation delay in the channel 231, and station 237 receives it with a delay equal to the propagation delay in channel 230. (It is assumed that the sum of the propagation delays in the channels 231 and 232 is greater than the propagation delay in channel 230).

After transmitting the sync-signal 801 the station 235 has a current access number (CAN) equal to the initial access number of this station, that is 0. The station 236 and 237, after receiving the sync-signal 801, have a current access number equal to 1 and 2, respectively. The value of TFR at the station 235 after the sync-signal has been transmitted is equal to 0, and the access window (AW) 802 will be opened at the station immediately after the sync-signal has been transmitted and the medium has become quiescent. To describe an illustrative procedure, it will be assumed that both the station 235 and the station 237 have a data frame for transmission, and the station 236 has no frame. During the time when the access window 802 is open, station 235 starts transmitting a data frame (DF) 803, the station 236 and 237 will receive this frame with the delay described above.

After transmission of the frame 803 the current access number of station 235 is CAN=(0–1) mod 3=2. After receiving the frame 803 the CAN of the station 236 is equal to 0 and the CAN of the station 237 is equal to 1. The access window 810 at station 236 after receiving the frame 803 will be open, but the station has no data frame for transmission and the medium will remain idle. Upon expiration of the time slot period TS after the data frame 803 has been received, the count of the access timer (TC) at station 237 becomes equal to the value of TFR and the access window 820 is opened. The station starts transmitting the data frame 821. Upon transmission of the frame 821 the current access number CAN of the station 237 is equal to 0. After receiving the frame 821 the station 235 and 236 have current access number equal to 1 and 2, respectively. At this time no station has a data frame for transmission and the medium remains quiescent.

Upon expiration of a period equal to 3TS after the data frame 821 has been transmitted the access timer count at the station 237 becomes equal to TSS, the station transmits the sync-signal 825 and the network will be reset to its initial position.

The current access number of the station 237 after the sync-signal has been transmitted becomes equal to the initial access number, that is equal to 2. After the sync-signal 825 has been received the current access number of the station 235 becomes equal to 0 and the CAN of the station 236 becomes equal 1.

If there is no failure in the network each station transmits its data to both channels connected to the station, and each station which receives data from one channel retransmits the received data to the other channel. For example, if the station 235 (FIG. 2C) transmits a data frame, the frame is transmitted simultaneously to both channels 230 and 231 connected to the station. The station 236 receives the frame from the channel 231 and retransmits it to the channel 232. The station 237 receives the frame from the channel 230 and retransmits it to the channel 232. No station will receive data from the channel 232. If in this situation the channel 231 is broken, the station 237 receives the data frame from channel 230 and retransmits it to channel 232. The station 236 receives the frame from channel 232.

Although preferred embodiments of the invention have been disclosed for illustrative purposes, those skilled in the art will appreciate that many additions, substitutions and modifications are possible without departing from the scope and spirit of the invention as defined by the accompanying claims.

I claim:

1. In a communication network including a communication medium and a plurality of stations, each having a unique initial access number and being connected to the medium, said medium having at least one channel for transmitting data between the stations, the data being composed of frames for transmitting messages and sync-signals for network synchronization; each station including transmitting means for transmitting data to the medium, receiving means for receiving data from the medium, an access timer for computing idle time during which all the channels connected to the station are quiescent, and detecting means for detecting the presence or absence of transmission on the channels connected to the station; a method of transmitting data to the medium by each station comprising the steps of:

assigning each station a current access number representative of the station's initial access number and the number of frames received and transmitted by the station after the sync-signal has been received or transmitted;

starting the access timer at each station upon detecting the absence of transmission on all channels connected to the station;

stopping the access timer at each station upon detecting the presence of transmission on a channel connected to the station;

assigning each station a predefined value of time of frame transmission, TFR, representative of the station's current access number and a network time slot, TS;

assigning each station a predefined value of time of synchro-signal transmission, TSS, representative of the station's current access number, the number of stations on the network and the network time slot TS;

opening an access window of predetermined duration for a station when the access timer idle time of the station reaches the value of the TFR; and permitting transmission of a frame from a station to all output channels to which the transmitting means of this station is connected, starting the transmission when the access window of this station is open.

2. The method of claim 1 wherein the step of assigning each station a current access number comprises the steps of:

upon receiving or transmitting the sync-signal, assigning each station a current access number, CAN, equal to IAN, where IAN is a unique station's initial access number selected from the sequence 0, 1, 2 ... N−1; and decreasing the current access number of each station by one modulo N after receiving a frame from the medium or transmitting a frame to the medium, where N is the number of stations in the network.

3. The method of claim 1 further comprising the step of causing each station to retransmit input data received after an idle period from an input channel in which it first appeared to all other channels to which the transmitting means of this station is connected.

4. The method of claim 3 further comprising the step of transmitting the sync-signal from a station to all channels to which the transmitting means of this station is connected, when the access timer idle time of this station reaches the value of the TSS.

5. The method of claim 1 further comprising the step of transmitting the sync-signal from a station to all channels to which the transmitting means of this station is connected, when the access timer idle time of this station reaches the value of the TSS.

6. In a communication network including a communication medium and a plurality of stations connected to the medium, said medium having at least one channel for transmitting data between the stations, the data being composed of frames for transmitting message and sync-signals for network synchronization; each station including a transmitting means for transmitting data to the medium, receiving means for receiving data from the medium, an access timer for computing idle time during which all the channels connected to the station are quiescent, and detecting means for detecting the presence or absence of transmission on the channels connected to the station; a method of transmitting data to the medium by each station comprising the steps of:

assigning each station a level of priority;

assigning each station a unique initial access set IAS including at least one of a plurality of unique initial access numbers (IANs) representative of the station's level of priority;

assigning each station a current access set CAS containing at least one access number, CAN, representative of the station's initial access set, IAS, and the number of frames received and transmitted by the station after the sync-signal has been received or transmitted;

starting the access timer at each station upon detecting the absence of transmission on all channels connected to the station;

stopping the access timer at each station upon detecting the presence of transmission on a channel connected to the station;

assigning each station a value of time of frame transmission, TFR, representative of the station's current access set, CAS, and the network time slot TS;

assigning each station a value of time of synchro-signal transmission, TSS, representative of the station's current access set, CAS, the number of IANs used in the network, NIAN, and the network time slot TS;

opening an access window of predetermined duration for a station when the access timer idle time for the station reaches the value of TFR; and permitting transmission of a frame from a station to all output channels to which the transmitting means of this station is connected, starting transmission when the access window of this station is open.

7. The method of claim 6 further comprising the step of causing each station to retransmit input data received after an idle period from an input channel in which it first appeared to all other channels to which the transmitting means of this station is connected.

8. The method of claim 7 further comprising the step of transmitting the sync-signal from a station to all channels to which the transmitting means of this station is connected, when the access timer idle time of this station reaches the value of the TSS.

9. The method of claim 6 further comprising the step of transmitting the sync-signal from a station to all channels to which the transmitting means of this station is connected, when the access timer idle time of this station reaches the value of the TSS.

10. In a communication network, including a communication medium and a plurality of stations, each having a unique initial access number and being connected to the medium, data composed of frames for transmitting messages and sync-signals for network synchronization, each station including transmitting means for transmitting data to the medium, receiving means for receiving data from the medium, an access timer for computing medium idle time, detecting means for detecting the presence or absence of transmission on the medium and a collision detector for detecting interfering communications; a method for transmitting data to the medium from each station comprising the steps of:

assigning each station a current access number representative of the station's initial access number and the number of frames receiving and transmitting by the station after a sync-signal has been received or transmitted by the station;

starting the access timer at each station upon detecting the absence of transmission on all channels connected to the station;

stopping the access timer at each station upon detecting the presence of transmission on a channel connected to the station;

assigning each station a predefined value of time of frame transmission, TFR, representative of the station's current access number and a network time slot TS;

assigning each station a predefined value of time of synchro-signal transmission, TSS, representative of the station's current access number, the number of stations on the network and the network time slot TS;

opening an access window of predetermined duration for a station when the access timer idle time of the station reaches the value of the TFR;

permitting transmission of a frame from a station to all output channels to which the transmitting means of this station is connected, starting the transmission when the access window of this station is open;

transmitting the sync-signal to the medium when the access timer of this station reaches the value of the TSS;

determining collision channels in the medium for collision detection;

detecting collisions in the determined collision channels; and interrupting transmission of a frame and transmitting the sync-signal to the medium upon detecting a collision.

11. The method of claim 10 wherein the step of assigning each station a current access number comprises the steps of:

upon receiving or transmitting the sync-signal, assigning each station a current access number, CAN, equal to IAN, where IAN is a station's unique initial access number selected from the sequence 0,1,2, ... N–I; and decreasing the current access number of each station by one Modulo N after receiving a frame from the medium or transmitting a frame to the medium, wherein N is the number of stations in the network.

12. The method of claim 10 further comprising the step of causing each station to retransmit input data received after an idle period from an input channel in which it first appeared to all other channels to which the transmitting means of this station is connected.

13. In a communication network, including a medium for transmitting data and a plurality of stations, each having at least one initial access number and being connected to the medium, the data including data frames and sync-signals; each station including an access timer for determining idle time, when the medium is quiescent; a method of transmitting data to the medium by the stations comprising the steps of:

assigning each station current access numbers representative of the initial access numbers and the number of frames received and transmitted by the station after the sync-signal has been received or transmitted;

starting the access timer at each station upon detecting that the medium is quiescent;

stopping the access timer at each station upon detecting the presence of transmission on the medium;

assigning each station values of time of frame transmission, TFR, and time of synchro-signal transmission, TSS, representative of the current access numbers; and permitting transmission of data frames from a station when the access timer idle time for the station reaches at least the value of the TFR.

14. The method of claim 13 further comprising the step of transmitting the sync-signal from a station to the medium when the access timer idle time of this station reaches at least the value of the TSS.

15. The method of claim 14 further comprising the step of causing stations to retransmit input data to output channels.

16. The method of claim 13 further comprising the step of causing stations to retransmit input data to output channels.

17. Apparatus for data transmission in a communication network including a communication medium and a plurality of stations connected to the medium, each station having a unique initial access number, said medium having at least one channel for transmitting data between the stations, the data being composed of frames for transmitting message and sync-signals for network synchronization; each station including a transmitting means for transmitting data to the medium, receiving means for receiving data from the medium, an access timer for computing idle time during which all the channels connected to the station are quiescent, and detecting means for detecting the presence or absence of transmission on the channels connected to the station; the apparatus comprising:

means for assigning each station a current access number representative of the station's initial access number and the number of the frames received and transmitted by the station after a sync-signal has been received or transmitted;

means responsive to the detecting means for starting the access timer at each station upon detecting the absence of transmission on all channels connected to the station;

means responsive to the detecting means for stopping the access timer at each station upon detecting the presence of transmission on a channel connected to the station;

means for computing a value of time of frame transmission, TFR, representative of the station's current access number and the network time slot, TS;

means for computing a value of time of synchro-signal transmission, TSS, representative of the station's current access number, the number of stations on the network and the network time slot TS;

means for opening an access window of predetermined duration when the access timer of a station reaches the value of the TFR; and means for transmitting a frame from a station, to all output channels to which the transmitting means of this station is connected, starting the transmission when the access window of this station is open.

18. The apparatus of claim 17 wherein the means for assigning each station a current access number comprises:

means responsive to the receipt or transmission of the sync-signal for assigning each station a current access number, CAN, equal to IAN, where IAN is an unique station's initial access number selected from the sequence 0, 1, 2, . . . N–I; and means for decreasing the current access number of each station by one modulo N after receiving a frame from the medium or transmitting a frame to the medium, where N is the number of stations in the network.

19. The apparatus of claim 17 further comprising means for retransmitting by each station input data received after an idle period from an input channel on which the data has first appeared to all other channels to which the transmitting means of this station is connected.

20. The apparatus of claim 19 further comprising means for transmitting the sync-signal from a station to all channels to which the transmitting means of this station is connected, when the access timer idle time of this station reaches the value of the TSS.

21. The apparatus of claim 17 further comprising means for transmitting the sync-signal from a station to all channels to which the transmitting means of this station is connected, when the access timer idle time of this station reaches the value of the TSS.

22. Apparatus for data transmission in a communication network including a communication medium and a plurality of stations connected to the medium, said medium having at least one channel for transmitting data between the stations, the data being composed of frames for transmitting message and sync-signals for network synchronization; each station including a transmitting means for transmitting data to the medium, receiving means for receiving data from the medium, an access timer for computing idle time during which all the channels connected to the station are quiescent, and detecting means for detecting the presence or absence of transmission on the channels connected to the station; the apparatus comprising:

means for assigning each station a level of priority;

means for assigning each station a unique initial access set, IAS, including at least one of a plurality of unique initial access numbers (IANs) representative of the station's level of priority;

means for assigning each station a current access set, CAS, containing at least one current access number, CAN, representative of the station's initial access set, IAS, and the number of frames received and transmitted by the station after the sync-signal has been received or transmitted;

means responsive to the detecting means for starting the access timer at each station upon detecting the absence of transmission on all channel connected to the station;

means responsive to the detecting means for stopping the access timer at each station upon detecting the presence of transmission on a channel connected to the station;

means for assigning each station a value of time of frame transmission, TFR, representative of the station's current access set CAS and the network time slot TS;

means for assigning each station a value of time of synchro-signal transmission, TSS, representative of the station's current access set CAS, the number of IANs used in the network, NIAN, and the network time slot TS; and means for opening an access window of predetermined duration for a station when the access timer idle time reaches the value of TFR; and means for transmitting a frame from a station to all output channels to which the transmitting means of this station is connected, starting the transmission when the access window of this station is open.

23. The apparatus of claim 22 further comprising means for causing each station to retransmit input data received after an idle period from an input channel on which the data has first appeared to all other channels to which the transmitting means of this station is connected.

24. The apparatus of claim 23 further comprising means for transmitting the sync-signal from a station to all channels to which the transmitting means of this station is connected, when the access timer idle time of this station reaches the value of the TSS.

25. The apparatus of claim 22 further comprising means for transmitting the sync-signal from a station to all channels to which the transmitting means of this station is connected, when the access timer idle time of this station reaches the value of the TSS.

26. Apparatus for data transmission in a communication network including a communication medium and a plurality of stations connected to the medium, each station having a unique initial access number, data being composed of frames for transmitting messages and sync-signals for network synchronization, each station including transmitting means for transmitting data to the medium, a receiving means for receiving data from the medium, an access timer for computing medium idle time, detecting means for detecting the presence or absence of transmission on the medium and a collision detector for detecting interfering communications comprising:

means for assigning each station a current access number representative of the station's initial access number and the number of frames receiving and transmitting by the station after a sync-signal has been received or transmitted by the station;

means responsive to the detecting means for starting the access timer at each station upon detecting the absence of transmission on all channels connected to the station;

means responsive to the detecting means for stopping the access timer at each station upon detecting the presence of transmission on a channel connected to the station;

means for computing for each station a predefined value of time of frame transmission, TFR, representative of the station's current access number and a network time slot, TS, a function of the network parameters;

means for computing for each station with a predefined value of time of synchro-signal transmission, TSS, representative of the station's current access number, the number of stations on the network and the network time slot TS;

means for opening an access window of predetermined duration for a station when the access timer idle time of a station reaches the value of the TFR; and means permitting transmission of a frame from a station to all output channels to which the transmitting means of this station is connected, starting the transmission when the access window of this station is open.

27. The apparatus of claim 26 wherein the means for assigning each station a current access number comprises:

means responsive to receiving or transmitting the sync-signal for assigning each station a current access number, CAN, equal to IAN,; where IAN is a unique station's initial access number selected from the sequence 0, 1, 2 . . . N–1; and means for decreasing the current access number of each station by one modulo N after receiving a frame from the medium or transmitting a frame to the medium, where N is the number of stations in the network.

28. The apparatus of claim 26 further comprising means for causing each station to retransmit input data received after an idle period from an input channel in which it first appeared to all other channels to which the transmitting means of this station is connected.

29. The apparatus of claim 28 further comprising means for transmitting the sync-signal to the medium when the access timer idle time of this station reaches the value of the TSS;

means for determining collision channels in the medium for collision detection;

means for detecting collisions in the determined collision channels; and means for interrupting transmission of a frame and transmitting the sync-signal to the medium upon detecting a collision.

30. The apparatus of claim 26 further comprising means for transmitting the sync-signal to the medium when the access timer idle time of this station reaches the value of the TSS;

means for determining collision channels in the medium for collision detection;

means for detecting collisions in the determined collision channels; and means for interrupting transmission of a frame and transmitting the sync-signal to the medium upon detecting a collision.

31. Apparatus for data transmission in a communication network, including a medium and a plurality of stations, each having a unique initial access number and being connected to the medium, the data including data frames and sync-signals; each station including an access timer for determining idle time, during which the medium is quiescent; the apparatus comprising:

means for assigning each station current access numbers representative of the initial access numbers and the number of frames received and transmitted by the station after the sync-signal has been received or transmitted;

means for starting the access timer at each station upon detecting that the medium is quiescent;

means for stopping the access timer at each station upon detecting the presence of transmission on the medium;

means for assigning each station values of time of frame transmission, TFR, and time of synchro-signal transmission, TSS, representative of the current access numbers; and means for enabling transmission of data frames from a station when the access timer idle time for the station reaches at least the value of the TFR.

32. The apparatus of claim 31 further comprising means for transmitting the sync-signal from a station to the medium when the access timer idle time of this station reaches at least the value of the TSS.

33. The apparatus of claim 32 further comprising means for causing stations to retransmit input data to output channels.

34. The apparatus of claim 31 further comprising means for causing stations to retransmit input data to output channels.

35. A method for data transmission in a communication network, including a medium and a plurality of stations, each station having at least one initial access number and being connected to the medium, the data including data frames and sync-signals; the method comprising the steps of:

assigning each station at least one current access numbers representative of the initial access numbers and the number of frames received and transmitted by the station after the sync-signal has been received or transmitted;

measuring at each station the duration of occurrences of idle time periods during which the medium is quiescent;

assigning each station at least one value of time of frame transmission, TFR, determined by the current access numbers; and enabling transmission of data frames from a station when the duration of an idle time period for the station reaches at least the value of the TFR.

36. The method of claim 35 further comprising the steps of:

assigning each station a time of synchro-signal transmission, TSS, determined by the current access numbers and the number of stations on the network; and transmitting the sync-signal from a station to the medium when the duration of an idle time period of the station reaches at least the value of the TSS.

37. The method of claim 36 further comprising the step of causing stations to retransmit input data to output channels.

38. The method of claim 35 further comprising the step of causing stations to retransmit input data to output channels.

39. The method of claim 35 further comprising the steps of detecting collisions in the medium, interrupting transmission of a frame and transmitting the sync-signal to the medium upon detecting a collision.

40. The method of claim 39 further comprising the steps of assigning each station a time of synchro-signal transmission, TSS, determined by the number of stations on the network, and enabling transmission of data frames from a station when the duration of an idle time period for the station reaches at least the value of the TSS.

* * * * *